Jan. 18, 1966    J. P. MARZENDORFER ET AL    3,229,779
MECHANICAL APPARATUS
Filed Aug. 31, 1961    3 Sheets-Sheet 1
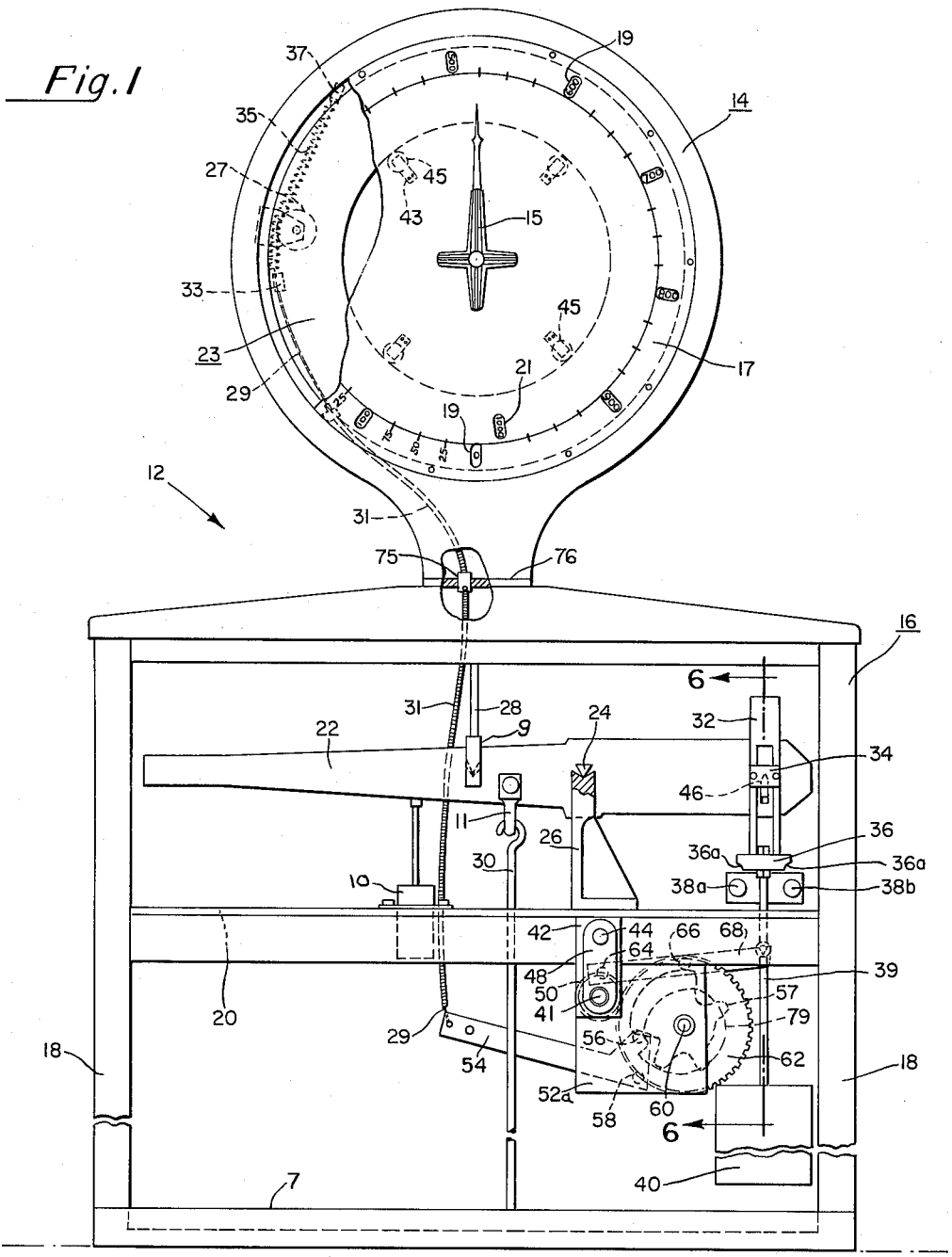
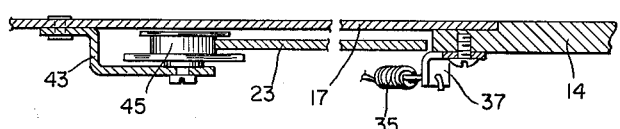
_Fig. 1_
_Fig. 5_
INVENTORS.
JEAN P. MARZENDORFER
RAYMOND D. RODD
BY
Nelson E. Kimmelman
ATTORNEY

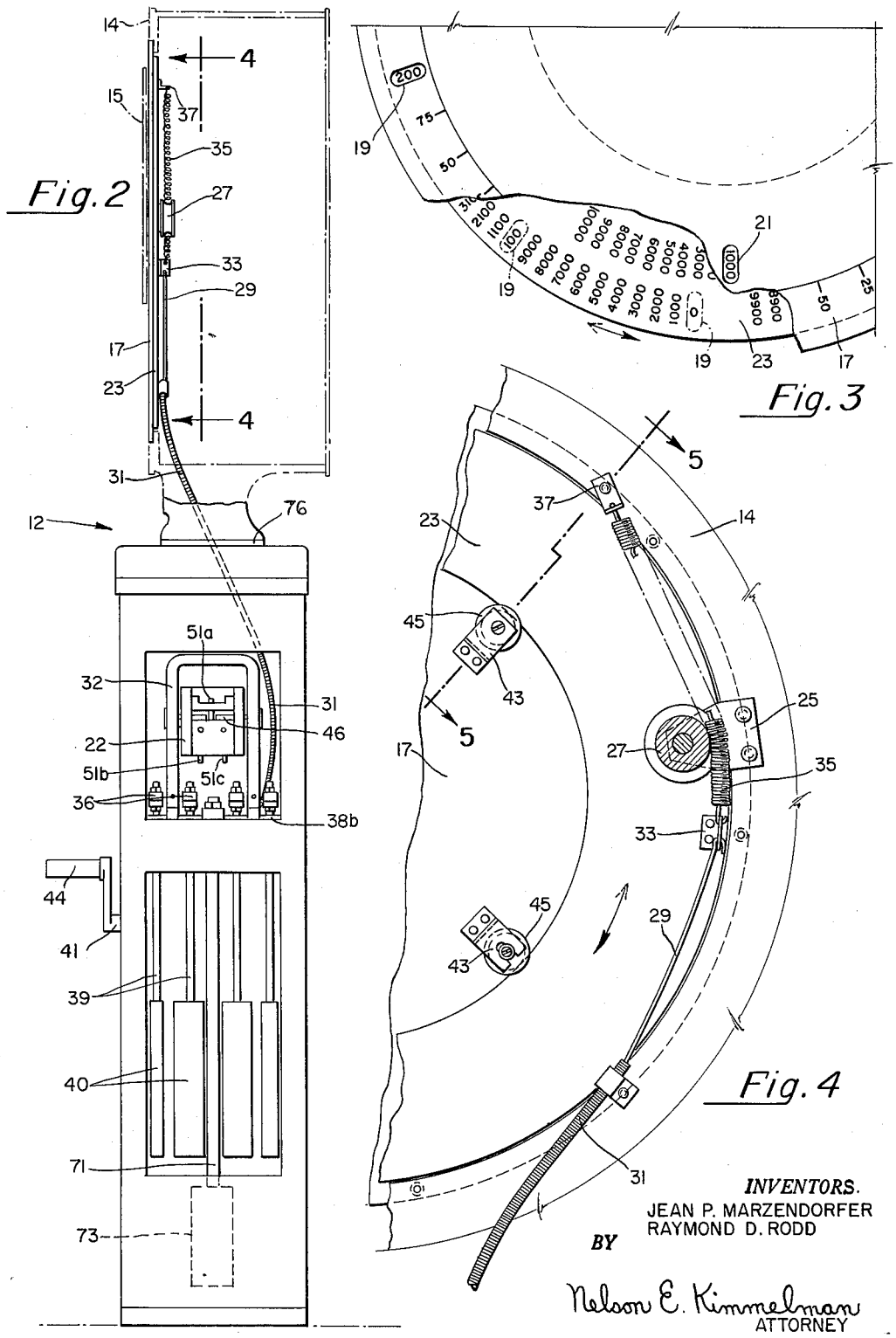

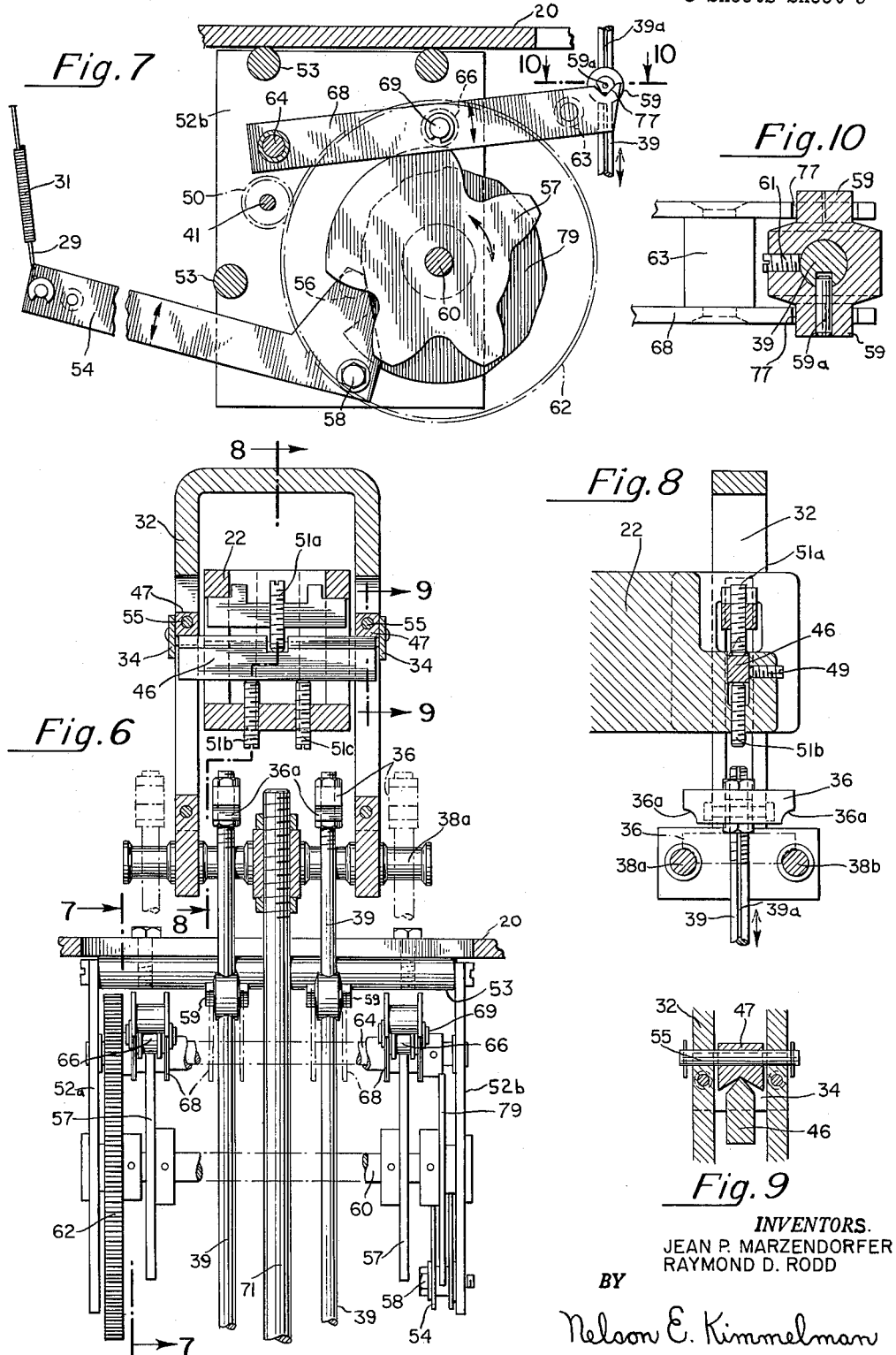

United States Patent Office 3,229,779
Patented Jan. 18, 1966

3,229,779
MECHANICAL APPARATUS
Jean P. Marzendorfer and Raymond D. Rodd, Rutland, Vt., assignors to Howe Richardson Scale Company, a corporation of Delaware
Filed Aug. 31, 1961, Ser. No. 135,346
5 Claims. (Cl. 177—204)

This invention relates to weighing apparatus. In particular it relates to a drop-weight scale having an improved coordinated system for simultaneously changing the range of the indicator dials as different unit weights are dropped.

In the prior art it has been customary in drop-weight scales to have means for changing the visible indicia on the dials to correspond to the different weight ranges as different ones of the drop-weights were brought into play. However, this has been accomplished by relatively elaborate gear systems coupled between the drop-weight mechanism located in the console of the scale and also coupled to the dials in the dial-head portion of the scale, there being interconnecting shafts and other linkage passing through the neck of the dial head from the console. This system was relatively expensive and complicated and it was further characterized by the fact that because of the linkage passing through the neck of the scale, it was difficult to seal the dial head against the entrance of dust and other undesired particles.

It is therefore an object of the present invention to provide a relatively simple and inexpensive mechanism for changing the dial indicia of a drop-weight scale to correspond to the addition of unit weights for enabling the various weight ranges to be utilized.

Another object of the invention is to provide a gearless system for changing the dials of a drop-weight scale to correspond to the various ranges of weights.

Still another object of the invention is to provide an improved system for changing the indicia on the dial of a drop-weight scale which permits the dial-head portion to be simply and effectively sealed against the entrance of dust.

Also, in prior art drop-weight scales the drop-weight assembly provided for enabling the various unit weights to be dropped on to the tare lever were so made that just after a unit-weight structure was dropped it oscillated for a time like a pendulum. While the unit weight was oscillating, of course, the indicator on the dial likewise was oscillating and usually an undesired length of time elapsed before the indicator came to rest at the correct weight reading.

It is therefore another object of the invention to provide an improved drop-weight assembly which effectively minimizes oscillation of the unit weights when dropped into position.

Another object of the invention is to provide an improved drop-weight assembly which enables the operator to read the correct weight sooner after a selected unit-weight has been dropped into position.

Still another object of the invention is to provide an improved, coordinated dial-changing and drop-weight system for drop-weight scales.

Other objects of the invention will be evident to those skilled in the art upon perusal of the specification, drawings, and claims herein.

These and other objects of the invention are attained by our invention in which a cam shaft having cams mounted thereupon may be operated simultaneously to change the indicia on the dial to correspond to the dropping of different unit-weights (ranges) into position. A first pivoted lever having a cam follower is provided which engages one of the cams, the other end of the lever being attached to a flexible cable which runs through the neck of the scale and is connected to a range-indicating dial positioned behind and concentric with a dial which is graduated in desired subdivisions of weight. In a preferred form of our invention, provision is made for the rear or range dial to be biased in a rotary direction opposite that in which the range dial is moved as the weight ranges are to be increased. Slots in the front dial enable the selected indicia of the range dial to appear.

Other levers having respective cam followers mounted thereon are also provided. These cam followers engage corresponding cams which thereby raise or lower selected ones of the unit drop-weights. Each unit-weight sub-assembly consists of a T-shaped structure with a unit-weight attached. The top of the T-shaped structure has two oppositely disposed curved indentations at its lower edges. A vertical rod depends from the top section and carries the unit-weight at its lower end. On the vertical rod are mounted one or more aligned knife edges disposed transversely thereto which are engaged by the levers. When the lever is lowered, the curved indentations in the top portion engage corresponding curved surfaces of two aligned spool-like members affixed to a bracket or yoke which rests upon a knife-edge connected to the tare lever. Thus, as the T-shaped structure falls the curved indentations make good contact with the correspondingly curved surfaces of the spool-like members on both sides and prevent pendulum-type oscillation so that the operator can immediately read the weight by observing the indicator at a rest position.

FIGURE 1 is a front elevation schematic view, partly broken-away, of the invention in one typical drop-weight scale embodiment;

FIGURE 2 is a side elevation schematic view of the overall scale shown in FIG. 1;

FIGURE 3 is an enlarged detail view of part of the dials contained in the dial head portion of the scale shown in FIG. 1;

FIGURE 4 is a rear view of part of dials within the dial-head taken along the line 4—4 of FIG. 2 and in the direction of the arrows;

FIGURE 5 is a sectional view taken along the line 5—5 of FIG. 4 in the direction indicated;

FIGURE 6 is a sectional view partly in phantom, taken along the line 6—6 of FIG. 1 in the direction indicated;

FIGURE 7 is a partially sectional view of the lever, cam and camshaft assembly taken along the section line 7—7 of FIG. 6;

FIGURE 8 is a partly sectional view of the yoke and unit-weight sub-assembly as seen in the direction of the arrows along the line 8—8 of FIG. 6;

FIGURE 9 is a sectional view of the bearing-block-knife edge combination taken along the line 9—9 of FIG. 6; and FIGURE 10 is a section view of the unit-weight knife edge taken along the line 10—10 of FIG. 7.

Referring in particular to FIG. 1, a drop-weight scale 12 is shown having a dial head 14 and a console section 16. The dial head 14 comprises a front dial 17 having a number of slots 19 and 21 therein through which the different range numerals appearing on a rear annular dial 23 appear (FIG. 3). The annular dial 23 is arranged concentric with the forward dial 17 and is held in place by flanged rollers 45 mounted upon brackets 43 (see FIGS. 4 and 5) which in turn are mounted on the rear surface of dial 17.

To move the dial 23 to bring the different numerals for different ranges into respective ones of the slots 19, in accordance with our invention, an L-sectioned bracket 33 is mounted on the rear surface of dial 23 and has two apertures therein. In one aperture one end of a flexible cable 29 is attached. In the other aperture one end of a spring 35 is connected whose other end is anchored to an L-sectioned bracket 37 which is attached to the frame of the dial head 14 (see FIG. 4). The spring 35 passes around a sheave 27 which is mounted upon a bracket 25 (FIG. 4). The other end of the flexible cable 29 is connected to a lever 54 which pivots about a shaft 58 (FIGS. 1, 6 and 7) which is attached to the rear vertical supporting plate 52b.

As shown in detail in FIG. 7 the lever 54 carries a cam-follower 56 mounted thereon which engages the edge surface of an eccentric cam 79. Cam 79 is mounted upon a cam-shaft 60 which is fixedly connected to a gear 62 that meshes with a gear 50 mounted upon a shaft 41 (FIG. 7). Fixed to the end of shaft 41 is a vertical crank 48 on which a handle 44 is perpendicularly mounted. As the handle 44 is rotated in a clockwise direction, the gear 62 is caused to rotate in a counterclockwise direction and thus the cam-follower 56 engages the various cam edges of the cam 79 causing the lever 54 to pivot in a counterclockwise direction. As the lever 54 does so, it pulls the cable 29 down by a small amount thus bringing into view the successive range indicia as shown in FIG. 3. Before rotation of the shaft 60 there will appear in the slot 19 a "0" and there will appear in the slot 21 the numeral "1000." When the shaft 60 is rotated so that the first cam surface is engaged by the follower 56 there will appear in the first slot 19 in place of the "0," the numeral "1000" whereas in the terminal slot 21 (FIG. 3) the numeral "2000" will appear. All the other slots 19 will show numerals successively increased by one-thousand compared with their former value. The spring 35 applies tension to the rear dial 23 to help in minimizing back lash.

It will be noted that the tubing 31 for the cable surrounding the shaft 29 passes through a neck-sealing portion 76 whose main function is to isolate the interior of the dial head 14 from the rest of the scale 12 to keep out dust and other foreign bodies from entering the dial head. At the point where the tubing 31 passes through the seal portion 76 a grommet or similar mechanism 75 is provided. This grommet may be rigid or of a flexible material which is wedged tightly around the tubing 31 within an appropriate aperture in the seal 76.

It is thus seen that our invention provides a simple, inexpensive and relatively trouble-free coupling between the crank 48 and the rear annular dial 23 for bringing into view the various range indicia of dial 23 within the slots 19 and 21. At the same time it enables an effective seal to be located between the dial head 14 and the console 18 to keep the dial head dust-free.

*Drop-weight assembly*

Having explained that portion of our invention which deals with the apparatus for changing the visible range indicia we now proceed to a description of the assembly associated therewith which provides oscillation-free dropping of the unit weights. The dial indicator 15 shown in FIG. 1 is coupled to a mechanism (not shown) which responds to tension on the rod 28 which in turn is coupled to the tare lever 22 by a conventional loop, bearing and knife-edge assembly generally indicated at the numeral 9 (FIG. 1). Pulling the tare lever downwards is the weight on the platform 7 which is transmitted via a hooked steelyard rod 30 that passes through a loop 11. The loop 11 is coupled by a conventional bearing block-knife edge assembly (not shown) to the tare lever 22. The tare lever itself pivots about a knife edge 24 which passes transversely through it and rests upon a fulcrum 26 that is supported upon a shelf 20 which is connected to the console cabinet 16. To assist in damping the movement of the tare lever 22 a dashpot 10 is coupled thereto, the stationary part of the dashpot being bolted to the shelf 20 for example.

To the right side of the fulcrum 26 is located our novel assembly for opposing the tension on the steelyard rod 30 produced by weight on the platform 7. It is this opposing mechanism which determines which of the various unit-weights are dropped effectively to add on to the weight of the fixed counterpoise 73 (FIG. 2). A yoke 32 straddles the right end of the tare lever 22 and is supported thereupon by means of bearing blocks 47 (FIGS. 6 and 9) which are held in place by pins 55. The lower edges of the bearing blocks 47 rest upon a knife edge 46 (FIGS. 1, 2, 6, 8 and 9) which extends transversely through the tare lever 22 on both sides. The knife edge may be adjusted vertically by means of set screws 51a, 51b and 51c (FIGS. 6 and 8). The yoke 32 supports at its lower ends two parallel rows of aligned, spool-like members 38a and 38b. The yoke also carries a vertical rod 71 which supports the counterpoise 73.

Associated with the cam-shaft 60 and a plurality of cams 57 mounted thereon are a number of pairs of levers 68 (FIGS. 1, 6, 7 and 10), the members of each pair being spaced from one another by a spacer 63 (FIGS. 7 and 10), on which are mounted respective cam followers 66 that revolve about respective shafts 69. These followers are constructed to engage the edge surfaces of the corresponding cams 57. The pairs of levers 68 pivot about the shaft 64 which is journalled in bearings located in apertures in the front and back plates 52a and 52b. The latter are spaced from one another by the posts 53 (FIG. 7) and are fixedly connected to the shelf 20 (FIG. 6).

Each lever of the pairs of levers 68 has at its right end a triangular indentation 77 which engages a knife or other bearing edge 59 (FIGS. 7 and 10) of the generally T-shaped unit weight sub-assembly. Each of the latter sub-assemblies comprises a top portion or bridge 36 (FIGS. 1, 2, 6 and 8) having transverse curved socket indentations 36a formed at its lower edges. Each sub-assembly also has a vertical central rod 39 mounted fixedly as shown. The bearing 59 is arranged transversely to the axis of the rod 39 so as to engage the V-shaped indentation 77 of each lever 68. The rod 39 (FIGS. 7, 8 and 10) has a longitudinal groove 39a therein (FIGS. 7 and 8) in which a pin 59a (FIGS. 7 and 10) mounted through one of the bearings 59 rides. This permits the bearing 59 to be moved up or down upon the rod 39 to the desired position whereupon set screw 61 may be tightened to hold it in place. At the respective ends of the rods 39 are the associated unit-weights 40.

As mentioned before, there are as many different cams 57 as there are unit-weights 40 to be dropped, only two of them being shown in FIG. 6 for the sake of clarity. Since they may all be different and may be mounted in any desired position on the camshaft 60 it is evident that the pivotal movement of the various pairs of levers 68 will depend thereupon. In practice, the cams are so formed and positioned on the camshaft that selected unit-weights 40 will be dropped so as to be supported by cradle 32 for various rotary positions of the crank 48 and the movement of the dial range-changing apparatus will be coordinated therewith. As may be seen in FIG. 8, when a unit weight sub-assembly is dropped onto the cradle by the pair of levers 68 associated therewith, the indented edges 36a will fit snugly and simultaneously against the corresponding curved surface of the members 38a and 38b and the rod 39 will not oscillate from left to right thereby preventing wiggling of the indicator 15.

While the invention has been explained in terms of weight dials and corresponding unit-weights, it is equally useful for other indicia-bearing members when they are to be moved in coordination with change of position of other members. Various applications of our invention will be apparent to those skilled in the art without departing from the essence of our invention. Consequently, we desire the scope of our invention to be limited only by the claims herein.

I claim:

1. In weighing apparatus of the type wherein an indicator coacts with a relatively stationary scale and is connected to be actuated by a member which is mounted to move in proportion to the weight being measured, means for increasing the weighing capacity of said apparatus comprising means for selectively applying unit weights of known value to said member in counterbalancing relation to said applied load, each such selective application of unit weight adapting said scale to a different weighing range, an auxiliary scale movably mounted on said stationary scale and connected to be displaced in accord with said selected weight application, and a window in said stationary scale exposing a portion of said auxiliary scale to indicate the selected weighing range.

2. In the weighing apparatus defined in claim 1, said auxiliary scale being an annulus that is rotatably mounted on said stationary scale and spring biased in one direction of said rotation.

3. In weighing apparatus of the type characterized by an indicator coacting with a scale and connected to be actuated by a pivoted tare lever, means for applying a load to be measured to said lever, and means for increasing the weighing capacity of said scale comprising a plurality of unit weights and means for selectively applying said weights to said lever comprising a yoke assembly pivotally supported on said lever and having two spaced cross members, a bridge centrally suspending each said unit weight and formed at opposite ends with symmetrically disposed sockets adapted to seat on said cross members, and associated cam and lever means for selectively raising and lowering said bridges with respect to said yoke cross members and at the same time actuating an indicator for said scale identifying the weight range corresponding to the applied unit weight.

4. In combination: a plurality of essentially circular planar members, selected ones of which have indicia thereupon, one of said members being annular and concentric with another thereof, roller means on the back of said other member rotatably mounting said one member, rotary driving means, flexible means coupled to said one movable member and to a pivoted lever having a cam-following element, a cam fixedly connected to said driving means and disposed to be engaged by said cam-following element, a selected number of other cams fixedly connected to said driving means, a selected number of pivoted lever units each including a pair of levers connected to pivot in unison and on which cam-following elements are mounted and arranged to follow said other cams, a selected number of unit-weight sub-assemblies, each having essentially symmetrical construction, each of said sub-assemblies comprising a top portion having two symmetrically disposed cylindrical indentations located at opposite edges thereof, a middle portion, a weight on said middle portion, and bearing means on said middle portion comprising two bearings having substantially V-shaped bearing surfaces, each of said selected number of lever units having supporting surfaces in the form of V-shaped notches on which corresponding ones of said bearing means surfaces can rest, and suspension means for said sub-assemblies including a yoke assembly adapted to fit over said weighing lever and rest on bearing surfaces extending transversely of said weighing lever on both sides thereof.

5. In weighing apparatus of the type wherein an indicator coacts with a relatively stationary scale and is connected to be actuated by a member which is mounted to move in proportion to the weight being measured, means for increasing the weighing capacity of said apparatus comprising means for selectively applying unit weights of known value to said member in counterbalancing relation to said applied load, each such selective application of unit weight adapting said scale to a different weighing range, an auxiliary scale movably mounted on said stationary scale, window means in said stationary scale exposing different scale ranges on said auxiliary scale, a plurality of cams mounted for rotation together about a common axis, one of said cams being a scale control cam and the other cams corresponding in number to the number of said unit weights, said means for selectively applying said unit weights to said member comprising mechanism individually connecting said other cams to their associated unit weights for application of said unit weights in predetermined relation to said member, and mechanism operably connecting said one cam to said auxiliary scale member to displace said auxiliary scale member in accord with said selected unit weight application to expose the associated scale range through said window means.

References Cited by the Examiner

UNITED STATES PATENTS

| | | | |
|---|---|---|---|
| 1,427,760 | 8/1922 | Ridge | 177—205 |
| 1,504,202 | 8/1924 | Anderson | 177—205 |
| 1,882,456 | 10/1932 | Starr | 177—205 |
| 2,014,275 | 9/1935 | Bousfield | 177—205 |
| 2,241,347 | 5/1941 | Hem | 177—205 |
| 2,387,242 | 10/1945 | Carliss | 177—205 |
| 2,864,606 | 12/1958 | Bradley et al. | 177—184 |

LEYLAND M. MARTIN, *Primary Examiner.*

LEO SMILOW, *Examiner.*